UNITED STATES PATENT OFFICE.

JULIUS HEINRICH LOUIS NEILSON, OF HANOVER-LINDEN, GERMANY.

PROCESS FOR REGENERATING RUBBER WASTE OF ALL KINDS.

No. 921,148.        Specification of Letters Patent.        Patented May 11, 1909.

Application filed August 31, 1905. Serial No. 276,650.

*To all whom it may concern:*

Be it known that I, JULIUS HEINRICH LOUIS NEILSON, chemist, a subject of the King of Prussia, residing at Hanover-Linden, Germany, have invented an Improvement in Processes for Regenerating Rubber Waste of All Kinds, of which the following is a specification.

As is well-known, it has already been proposed, for the purpose of regenerating vulcanized caoutchouc, to dissolve the caoutchouc in a solvent (more particularly in petroleum or in a mixture of petroleum and benzin) to concentrate the solution by evaporation to the consistency of syrup and to then boil the mass with acetone for a time, decant off the acetone-containing liquid from the caoutchouc mass and then boil the latter with alcoholic soda which is likewise decanted off, whereupon the mass is again boiled with alcohol and then with water. Consequently the process is tedious and has the further drawback that the purifying agents do not act upon the caoutchouc in solution, but in solid form, whereby the impurities, and more particularly the sulfur, cannot be dissolved out readily, while there is also the possibility that in the evaporation of the solvent, substances may be precipitated out which cannot be again dissolved in the acetone or alcohol. Finally, in said process, it is not easy to separate any remaining solvent from the precipitating agent, and the process requires a great deal of heat, because all the subsequent operations must always be carried out with heat. According to the present process it is possible to avoid these drawbacks and to effect in the most simple and economical manner a thorough devulcanization and purification of caoutchouc-waste or rubber-waste of all kinds by the following procedure.

The waste of vulcanized rubbers (caoutchouc, guttapercha or the like) and also of hard rubber at a suitable temperature (in the case of vulcanized caoutchouc at about 200–300 degrees, and in the case of vulcanized guttapercha at about 80–130 degrees C.) is dissolved with heat in resin oil that is obtained by the distillation of colophony and has a boiling point of about 300 to 360 degrees. This resin oil I have found by experiment to be the most suitable solvent besides the well-known caoutchouc oil. The undissolved substances, a portion of the resins and of the sulfur, and also the mineral or vegetable constituents (fibrous tissue or the like) are separated by suitable means, such as for example by filtration. This purified solution of the caoutchouc or the like is then mixed with a ketone, for instance, acetone, whereby the rubber substance or the like is precipitated, while dissolving the resin oil and also the portions of resin, pitch, sulfur or the like which are present or have remained over. These operations may be repeated if desired. The rubber substance or the like, thus obtained, is washed in the precipitating agent, and, if necessary, boiled in water and dried, whereupon it is suitable for further treatment. The solvent and precipitating agent may be readily separated by distillation, and therefore be used over again.

It is known (British Patent 17936/97) that guttapercha can be obtained from parts of plants containing the same, or from raw guttapercha after treatment with alkali, by dissolving the natural guttapercha substance in resin oil and precipitating again by means of acetone or the like, but it was not possible to deduce from this, that by dissolving in resin oil and precipitating by means of acetone etc., waste vulcanized guttapercha or vulcanized caoutchouc, balata or the like could actually be devulcanized and regenerated in the most simple manner, that is to say, that by such means it was possible to obtain in practical working from the waste of said vulcanized products, caoutchouc substance or guttapercha substance or the like substance sufficiently free from sulfur. It was the more impossible to foresee this because it has hitherto been considered necessary, and therefore it has been proposed to treat a caoutchouc mass (treated with acetone) with soda and several times with alcohol.

Having now described my invention, what I claim and desire to secure by Letters Patent is:—

1. A process for the devulcanization of vulcanized gums, which consists in dissolving the vulcanized gum in resin oil of a high boiling point and precipitating the gum from the solution by means of a ketone.

2. A process for the devulcanization of vulcanized rubber which consists in dissolving the vulcanized rubber in the products of distillation of colophony of high boiling point and then precipitating the rubber from the solution by means of a ketone.

Signed by me this nineteenth day of August 1905.

JULIUS HEINRICH LOUIS NEILSON.

Witnesses:
M. ERDMANN,
D. SCHMIDT.